United States Patent
Brouwer et al.

(10) Patent No.: US 10,619,127 B2
(45) Date of Patent: Apr. 14, 2020

(54) LIGHT-STABLE HOP EXTRACT

(71) Applicant: HEINEKEN SUPPLY CHAIN B.V., Zoeterwoude (NL)

(72) Inventors: Eric Richard Brouwer, Zoeterwoude (NL); Tinne Dekoninck, Zoeterwoude (NL); Nele Vanbeneden, Zoeterwoude (NL); Marcel Van Veen, Zoeterwoude (NL); Maria Elizabeth Wilhelmina Schouten, Zoeterwoude (NL)

(73) Assignee: HEINEKEN SUPPLY CHAIN B.V., Zoeterwoude (NL)

( * ) Notice: Subject to any disclaimer, the term of this patent is extended or adjusted under 35 U.S.C. 154(b) by 0 days.

(21) Appl. No.: 16/075,426

(22) PCT Filed: Feb. 3, 2017

(86) PCT No.: PCT/EP2017/052446
§ 371 (c)(1),
(2) Date: Aug. 3, 2018

(87) PCT Pub. No.: WO2017/134260
PCT Pub. Date: Aug. 10, 2017

(65) Prior Publication Data
US 2019/0040342 A1 Feb. 7, 2019

(30) Foreign Application Priority Data
Feb. 5, 2016 (EP) ..................................... 16154513

(51) Int. Cl.
*C12C 3/12* (2006.01)
*C12H 1/16* (2006.01)
*C12C 3/08* (2006.01)

(52) U.S. Cl.
CPC ............... *C12C 3/12* (2013.01); *C12H 1/165* (2013.01); *C12C 3/08* (2013.01)

(58) Field of Classification Search
None
See application file for complete search history.

(56) References Cited

U.S. PATENT DOCUMENTS

| 3,044,879 | A | * | 7/1962 | Kissel et al. | C12C 3/00 426/16 |
| 3,155,522 | A | * | 11/1964 | Hildebrand | C12C 3/00 426/240 |
| 3,298,835 | A | * | 1/1967 | Hildebrand | C12C 3/00 426/312 |
| 3,615,660 | A | * | 10/1971 | Bavisotto et al. | C12C 3/12 426/600 |
| 4,767,640 | A | | 8/1988 | Goldstein et al. | |
| 5,811,144 | A | | 9/1998 | Bordeleau et al. | |
| 2002/0106422 | A1 | * | 8/2002 | McGarrity | C12C 7/00 426/29 |
| 2005/0158798 | A1 | * | 7/2005 | Sher | C12C 12/00 435/7.1 |

FOREIGN PATENT DOCUMENTS

| AU | 7540281 A | * | 3/1982 | ........... B01J 19/127 |
| GB | 1006937 A | * | 10/1965 | ............... C12C 3/00 |
| GB | 2 362 891 A | | 12/2001 | |
| WO | 1993-058778 | * | 7/1992 | ............... C12C 9/02 |
| WO | WO-2006/104387 A1 | | 10/2006 | |
| WO | WO-2011/054838 A2 | | 5/2011 | |

OTHER PUBLICATIONS

Zufall et al. "The Influence of Hop Products on Beer Flavour Stability", BrewingScience, May 2008, pp. 113-120. (Year: 2008).*
"Solar Radiation", https://www.kippzonen.com/Knowledge-Center/Theoretical-info/Solar-Radiation, pp. 1-3. (Year: 2014).*
O'Rourke, T., "Hops and hop products", The Brewer International, Jan. 2003, 3(1):21-25.
Huvaere, K., et al., "Flavin-induced photodecomposition of sulfur-containing amino acids is decisive in the formation of beer lightstruck flavor", Photochem. Photobiol. Sci., 2006, 5:961-969.
International Search Report and Written Opinion in PCT/EP2017/052446, dated Apr. 11, 2017, 8 sheets.
International Preliminary Report on Patentability in PCT/EP2017/052446, dated Jan. 29, 2018, 12 pages.

* cited by examiner

*Primary Examiner* — Nikki H. Dees
*Assistant Examiner* — Amber M Cox
(74) *Attorney, Agent, or Firm* — Gilberto M. Villacorta; Sunit Talapatra; Foley & Lardner LLP

(57) ABSTRACT

The invention relates to a method of preparing a light-stable hop extract, said method comprising: providing a pre-isomerised hop extract comprising at least 10% of iso-alpha acids by weight of dry matter, and illuminating the pre-isomerised hop extract, optionally after dilution of the pre-isomerised hop extract.

23 Claims, No Drawings

LIGHT-STABLE HOP EXTRACT

CROSS-REFERENCE TO RELATED APPLICATIONS

This application is the National Phase of International Patent Application No. PCT/EP2017/052446 filed Feb. 3, 2017, published Aug. 10, 2017 as WO 2017/134260 A1, which claims priority to European Patent Application No. 16154513.2 filed Feb. 5, 2016. The contents of these applications are herein incorporated by reference in their entirety.

TECHNICAL FIELD OF THE INVENTION

The present invention relates to light-stable hop extracts and to the application of such hop extracts in beer. The invention further provides a method of preparing such a light-stable hop extract, said method comprising illuminating a pre-isomerised hop extract.

BACKGROUND OF THE INVENTION

Hops are the female flowers of the hop plant *Humulus lupulus*. They are used as an ingredient in beer, to which they impart a bitter, tangy flavour. Hops are usually dried in an oast house before they are used in the brewing process. In the brewing process the wort (sugar-rich liquid produced from malt) is boiled with hops before it is cooled down and yeast is added, to start fermentation.

Boiling the wort with hops results in the extraction of alpha acids (humulones, such as humulone, adhumulone, cohumulone, posthumulone and prehumulone) into the sweet wort, which under the influence of temperature (thermal isomerisation) are partially isomerised to the corresponding iso-alpha acids (isohumulones). These iso-alpha acids are responsible for the characteristic bitter taste of hopped beer. Typical alpha acid levels in the wort at the start of the wort boiling are below 0.01 wt % (below 100 ppm). Disadvantages of this traditional hopping approach to impart bitterness are the inefficient alpha acid extraction and isomerisation, typically resulting in iso-alpha acid yields below 40%.

Hop utilization can be improved significantly by performing the alpha acid isomerisation outside the brewing process. To this end pre-isomerised hop products have been developed. These pre-isomerised hop product are produced starting from hop extract.

Hop extracts are usually obtained via liquid or supercritical carbon dioxide extraction. Carbon dioxide hop extracts provide predominantly alpha acids (humulones) next to beta acids (lupulones), and they can be further fractionated to obtain alpha acid enriched hop extracts.

Starting from these alpha acid containing extracts, the "off-line" pre-isomerisation of alpha acids outside the brewing (wort boiling) process can be achieved using alkali metal and/or alkaline earth metal based compounds via two approaches. The first approach applies a solvent-free reaction medium while in the other approach the transformation is performed after addition of solvents, either pure water or alternatively water mixed with an organic solvent.

It is known to isomerise alpha acid to iso-alpha acids by means of photolysis. AU 7540281, for instance, describes a process for the up-grading of the bitter substances from hops, and more particularly of practically pure alpha- and beta acids obtained from a highly purified hop extract, particularly by treatment with liquid carbon dioxide, characterized in that the alpha and/or beta acids are subjected to photolysis by sunlight, for a predetermined duration, under conditions adapted to produce an optimum quantic yield under suitable temperature conditions, preferably close to 60° C., to obtain respectively iso-alpha acids and deoxy-alpha acids U.S. Pat. No. 4,767,640 describes a method of preparing light stable hop product that essentially consists of reduced isohumulones, and less than 0.5% unreduced isohumulones and non-isohumulones unstable products. Example 1 describes a process in which an isomerized hop extract was reduced, followed by acidification and separation of the aqueous layer and the oily layer. The oily extract so obtained contained 70% reduced isohumulone, 6.5% background material and less than 0.5% unreduced isohumulone. Example 3 describes how the oily extract was further purified to yield a "Post Purified Aqueous Phase" and a "Post Purified Oil Phase". Example 4 describes the chromatographic separation of the oily extract of Example 1 into three fractions. Example 5 describes an experiment in which the light stability of the aforementioned purified extracts ("Post Purified Aqueous Phase" and a "Post Purified Oil Phase") and of the three chromatographic fractions was evaluated. This was done by adding these materials to beer and irradiating for 2 hours with 600 foot candles of fluorescent light.

WO 93/02177 describes a process for producing a foam stabilizing and bittering agent for a malt beverage characterized by extracting hops under conditions which favour the separation and recovery of a fraction rich in adprehumulone, and subjecting the adprehumulone fraction to photo-isomerisation to produce iso-adprehumulone.

It is well-known that the flavour quality of beer is compromised by exposure to light, a phenomenon which is generally referred to as 'lightstruck' or 'sunstruck' flavour, and which is triggered by light-induced degradation of iso-alpha acids.

The formal mechanism for formation of beer lightstruck flavour in model systems, composed of isohumulones, riboflavin, and cysteine, on exposure to visible light, has been suggested by Kuroiwa et al. already in 1963. Photo-excited riboflavin induces cleavage of isohumulones to a 4-methylpent-3-enoyl radical, which undergoes decarbonylation to a 3-methylbut-2-enyl radical. Trapping of this stabilized allyl radical by a thiol radical derived from cysteine leads to formation of 3-methylbut-2-ene-1-thiol (3-MBT), the substance responsible for lightstruck flavour. 3-MBT has an extremely low flavour threshold level of around or below 1 ppt.

In order for the formation of 3-MBT to occur in beer besides iso-alpha acids, the reaction requires light energy in the 300-550 nm range of the spectrum, a photosensitizer (e.g. riboflavin, i.e. vitamin B2), and a sulphur source (e.g. sulphur containing amino acid).

The photolytic degradation of iso-alpha acids occurs as a consequence of the presence of an iso-3-hexenoyl side chain in the iso-alpha acid molecules. By modifying the molecular structure of the iso-alpha acids, notably by reducing the C=C and/or C=O bonds in the iso-3-hexenoyl side chain, substantial 3-MBT formation in beer can be prevented.

Reduced iso-alpha acid derivatives that are commercially available contain dihydro-, tetrahydro- and/or hexahydro-iso-alpha acids, and are usually added after the primary fermentation stage of the brewing process. The dihydro-iso-alpha acids (also called rho-iso-alpha acids) are obtained by the reduction of the carbonyl group in the aforementioned iso-3-hexenoyl chain to a hydroxyl group, generally using alkali metal borohydride as the reducing agent. The tetrahydro-iso-alpha acids are obtained via hydrogenation of the C=C bonds in the aforementioned iso-3-hexenoyl side chain and the isopentenyl side chain. The hexahydro-iso-alpha acids are produced by combining the aforementioned reduction and hydrogenation processes.

There is a need for a pre-isomerised hop extract that is light-stable, i.e. that does not substantially contribute to the formation of 3-MBT in light-exposed beer, but that has not been chemically reduced/hydrogenated.

SUMMARY OF THE INVENTION

The inventors have unexpectedly discovered that light-stability of pre-isomerised hop extracts can be improved substantially by illuminating such hop extracts with sunlight. Although the inventors do not wish to be bound by theory, it is believed that as a result of this illumination iso-alpha acids undergo the same type of photolytic degradation that is responsible for the formation of 3-MBT in beer. However, in the absence of important reactants (such as thiol-containing substances), the reactive intermediate degradation products formed during illumination that would otherwise participate in the formation of 3-MBT, are converted into other reaction products that do not adversely affect the flavour or flavour stability of beer.

The illumination of pre-isomerised hop extract in accordance with the present invention greatly improves the light-stability of the hop extract, but surprisingly it has not more than a limited impact on the bitterness and desirable flavour characteristics of the hop extract.

Thus, one aspect of the invention concerns a method of preparing a light-stable hop extract, said method comprising:
providing a pre-isomerised hop extract comprising at least 10% of iso-alpha acids by weight of dry matter, and
illuminating the pre-isomerised hop extract, optionally after dilution of the pre-isomerised hop extract.

The invention also relates to a light-stable hop extract that can be obtained by the aforementioned method and to the use of this light-stable hop extract in the production of beer.

DETAILED DESCRIPTION OF THE INVENTION

Accordingly, a first aspect of the present invention relates to a method of preparing a light-stable hop extract, said method comprising:
providing a pre-isomerised hop extract comprising at least 10% of iso-alpha acids by weight of dry matter,
illuminating the pre-isomerised hop extract, optionally after dilution of the pre-isomerised hop extract, with an illumination intensity of at least 50 W/m$^2$ for at least 30 minutes.

The term "iso-alpha acids" as used herein refers to substances selected from the group of isohumulone, isoadhumulone, isocohumulone, pre-isohumulone, post-isohumulone and combinations thereof. The term "iso-alpha acids" encompasses different stereo-isomers (cis-iso-alpha acids and trans-iso-alpha acids).

The term "alpha acids" as used herein refers to substances selected from the group of humulone, adhumulone, cohumulone, prehumulone, posthumulone and combinations thereof.

The term "beta acids" as used herein refers to substances selected from the group of lupulone, adlupulone, colupulone, prelupulone, and postlupulone and combinations thereof.

The term "beer" as used herein encompasses both alcohol-containing and alcohol-free beer.

According to a particularly preferred embodiment of the present method, the pre-isomerised hop extract is illuminated with light having a maximum intensity at a wavelength in the range of 200-800 nm, more preferably in the range of 250-600 nm, most preferably of 300-500 nm.

The illumination intensity employed in the present method preferably exceeds 50 W/m$^2$. More preferably, said illumination intensity exceeds 100 W/m$^2$, most preferably it exceeds 200 W/m$^2$.

The pre-isomerised hop extract is typically illuminated with the aforementioned illumination intensity for at least 30 minutes, more preferably for at least 1 hour and most preferably for 2-48 hours.

During illumination the temperature of the hop extract typically remains within the range of 0-100° C., more preferably of 15-80° C.

The inventors have found that particularly good results can be obtained if the pre-isomerised hop extract is exposed to illumination after being diluted with water. Accordingly, in accordance with a particularly preferred embodiment, the present method comprises the steps of:
diluting the pre-isomerised extract with water to produce an aqueous solution; and
illuminating an aqueous solution of the pre-isomerised hop extract.

The aqueous diluted solution of the pre-isomerised hop extract typically has an iso-alpha acid content in the range of 0.2-200 g/l, more preferably of 0.5-70 g/l and most preferably 1-25 g/l when the illuminations starts.

The aqueous diluted solution of the pre-isomerised hop extract typically contains at least 80 wt. % water. Even more preferably said dilution contains at least 90 wt. % water. Most preferably, at least 95 wt. % water.

Another aspect of the present invention relates to a light-stable pre-isomerised hop extract that can be obtained by the method described herein. Preferably, the light-stable pre-isomerised hop extract is actually obtained by said method.

The light-stable hop extract of the present invention typically contains at least 1%, more preferably at least 2% and most preferably at least 3% of iso-alpha acids by weight of dry matter.

Alpha acids are typically contained in the light-stable hop extract in a concentration of 0-10%, more preferably of 0-3% and most preferably of 0.01-2% by weight of dry matter.

The light-stable hop extract of the present invention typically contains 0-10% beta acids by weight of dry matter, more preferably 0-5% beta acids by weight of dry matter.

The amount of reduced iso-alpha acids (dihydro-iso-alpha acids, tetrahydro-iso-alpha acids and hexahydro-iso-alpha acids) in the light-stable hop extract preferably does not exceed 10% by weight of the iso-alpha acids. Even more preferably the amount of reduced iso-alpha acids does not exceed 3% by weight of the iso-alpha acids.

The light-stable hop extract preferably is a hop extract that has been isolated from hop by means of extraction of with liquid or supercritical carbon dioxide.

The light-stable hop extract of the present invention preferably is a pre-isomerised hop extract, more preferably a pre-isomerised hop extract containing iso-alpha acids and alpha acids in a weight ratio that exceeds 10:1, most preferably in a weight ratio that exceeds 20:1.

The light-stable hop extract preferably has a water content of at least 30 wt. %, more preferably a water content of at least 50 wt. % and most preferably of at least 70 wt. %.

Yet another aspect of the present invention relates to a process of preparing a light-stable beer, said process comprising introducing the hop extract of the present invention.

As explained herein before, riboflavin plays an important role in the light-induced formation of 3-MBT in beer. Riboflavin is naturally present in beer and undergoes extremely rapid photolysis. As a matter of fact, in ordinary beer riboflavin is photolysed much more rapidly than iso-alpha acids. Thus, in light-struck beer riboflavin content is usually reduced to only a fraction of the original content even before a significant fraction of the iso-alpha acids has been photolysed.

The riboflavin content of the light-stable beer that is produced in the present process preferably is at least 60 µg/l. Most preferably, the riboflavin content is in the range of 80 to 2,000 µg/l.

The present process preferably yields a light-stable beer that contains at least 0.1 mg/l, more preferably at least 0.3 mg/l, even more preferably at least 0.6 mg/l and most preferably at least 1 mg/l of iso-alpha acids. Typically the level of iso-alpha acids in the beer will not exceed 30 mg/l.

The present process typically produces a light-stable beer that contains less than 100 ng/l 3-methyl-2-butene-1-thiol (3-MBT). Even more preferably the 3-MBT content is less than 50 ng/l, most preferably less than 30 ng/l. The concentration of 3-MBT can suitably be determined by means of the method described by Hughes et al. (Hughes P. S., Burke S. and Meacham A. E. (1997) "Aspects of the lightstruck character of beer". Institute of Brewing, Proceedings of the 6th Central and South Africa Section, pp. 123-128).

In the present process the light-stable hop extract is preferably added to wort or beer before clarification, i.e. before removal of entrained solids and yeast from the fermented beer. Typically, clarification of fermented beer is achieved by means of filtration.

In the aforementioned process the light-stable hop extract is preferably introduced into the wort or beer in a concentration of at least 2 mg/l, more preferably in a concentration of 5-200 mg/l, most preferably in a concentration of 10-150 mg/l.

Following addition of the light-stable hop extract to the wort, the wort is subjected to further processing steps, including:
fermenting the wort with the help of brewer's yeast;
clarifying the fermented beer; and
packaging.

The invention is further illustrated by the following non-limiting examples.

EXAMPLES

Method of Determining the Concentration of Riboflavin

The concentration of riboflavin in beer can be determined by means of UPLC-FLR using equipment, materials and conditions as described below.
Equipment:
UPLC system: Acquity UPLC (Waters) equipped with a BEH C18 column (1.7 µm, 2.1 mm×150 mm; Waters product number: 186002353)
Detector: Acquity Fluorescence (FLR) detector (Waters)
Chemicals:
Milli-Q® Ultrapure Water
Acetonitrile≥99.9% (Sigma Aldrich product number: 34998)
Phosphoric acid≥85.0% (Sigma Aldrich product number: 30417)
Riboflavin (Sigma Aldrich product number: R-7649)
Sodium dihydrogen phosphate monohydrate (Merck product number: 106346)
pH buffer 2.7 (7.5 g sodium dihydrogen phosphate monohydrate in 200 mL Ultrapure water+1 mL Phosphoric acid in 1000 mL Ultrapure water)
UPLC Instrument Conditions:
Column temperature: 40° C.
Injection volume: 10 µL
Sample temperature: 10° C.
Run time: 15 min
Eluens A=pH buffer 2.7
Eluens B=acetonitrile
Gradient:

| Time (min) | Flow (mL/min) | % A | % B |
| --- | --- | --- | --- |
| 0.00 | 0.20 | 95 | 5 |
| 10.0 | 0.20 | 95 | 5 |
| 10.5 | 0.20 | 15 | 85 |
| 12.0 | 0.20 | 15 | 85 |
| 12.2 | 0.20 | 95 | 5 |
| 15.0 | 0.20 | 95 | 5 |

Detector Conditions:
$\lambda_{ex}$=444 nm
$\lambda_{em}$=525 nm
Samples are degassed prior to analysis.

Example 1

A pre-isomerised hop extract (so-called 'Isohop' obtained from Barth-Haas Group) was used as a starting material. This hop extract had the following characteristics (according to the product description sheet from Barth-Haas Group):
contains 30±0.5 wt % iso-alpha acids
contains <0.7% alpha acids
contains <0.3% beta acids The pre-isomerised hop extract was diluted with 'Milli-Q® Ultrapure Water' (1:50 w/w). 16 mL of the diluted hop extract was introduced into a glass tube with screw cap (Duran glass, tube diameter is 16 mm, tube length is 160 mm). 30 of these glass tubes were simultaneously illuminated for a period of 32 hours inside a Suntest XLS+ device (ATLAS), using a Xenon lamp. During illumination, the following conditions were applicable:
Power of Xenon lamp is 1700 W
Tubes were horizontally positioned inside the Suntest XLS+ device
Distance between glass tubes and lamp is 25 cm
Amount of irradiance at sample level was set at 765 W/m$^2$
Temperature of diluted hop extract increases from ambient to circa 50° C. (no cooling nor heating was intentionally applied during illumination)

Example 2

The illuminated and non-illuminated hop extracts of Example 1 were added to unhopped beer (300 mL unhopped beer in green bottle). A first beer (reference beer) was prepared by adding 20 mg/L of the non-illuminated hop extract. A second beer (light-stable beer) was prepared by adding 60 mg/L of the illuminated hop extract. The illuminated hop extract was applied in a higher concentration in order to compensate for the loss in bitter intensity that had occurred as a result of the illumination. The flavour profile of the beer containing the illuminated hop extract had a flavour profile that was very similar to that of the beer containing the non-illuminated hop extract.

Both beers were exposed to artificial sunlight by putting the bottles horizontally in the Suntest XLS+ device and illuminating them for a period of 24 hours. During illumination, the same conditions were applied as in Example 1.

Before and during exposure to the artificial sunlight the concentrations of the following substances were determined in both beers:
 iso-alpha acids,
 riboflavin, and
 3-MBT.

Determination of iso-alpha acids in beer was performed according to the method described by the American Society of Brewing Chemists (ASBC) in 2009 (Methods of Analysis, 14th Edition): 'Method Beer 23 (section E: Iso-alpha acids in beer by HPLC)'. The 3-MBT content was determined using the method described by Hughes et al. ('Aspects of the lightstruck character of beer'. Institute of Brewing, Proceedings of the 6$^{th}$ Central and South Africa Section (1997), pp. 123-128).

The results of these analyses are summarised in Table 3:

TABLE 3

|  | Iso-alpha acids (mg/L) | Riboflavin (µg/L) | MBT (ng/L) |
| --- | --- | --- | --- |
| Reference beer | | | |
| 0 h illumination | 19.2 | 318 | 7 |
| 2 h illumination | 18.8 | 16 | 309 |
| 6 h illumination | 17.8 | 2.8 | 660 |
| 24 h illumination | 16.0 | 0.3 | 2072 |
| Light-stable beer | | | |
| 0 h illumination | 4.5 | 313 | 8 |
| 2 h illumination | 4.4 | 15 | 74 |
| 6 h illumination | 4.2 | 2.0 | 137 |
| 24 h illumination | 3.6 | 0.4 | 506 |

The invention claimed is:

1. A method of preparing a light-stable hop extract, comprising:
 (a) providing a pre-isomerised hop extract comprising at least 10% of iso-alpha acids by weight of dry matter, the iso-alpha acids being selected from the group consisting of isohumulone, isoadhumulone, isocohumulone, pre-isohumulone, post-isohumulone and combinations thereof; and
 (b) illuminating the pre-isomerised hop extract, optionally after dilution of the pre-isomerised hop extract, with an illumination intensity of at least 50 W/m$^2$ for at least 30 minutes, wherein the pre-isomerised hop extract when diluted has an iso-alpha acid content in the range of 0.2-200 g/l.

2. The method according to claim 1, wherein the pre-isomerised hop extract is illuminated with light having a maximum intensity at a wavelength in the range of 200-800 nm.

3. The method according to claim 2, wherein the pre-isomerised hop extract is illuminated with light having a maximum intensity at a wavelength in the range of 250-600 nm.

4. The method according to claim 3, wherein the pre-isomerised hop extract is illuminated with light having a maximum intensity at a wavelength in the range of 300-500 nm.

5. The method according to claim 1, wherein the pre-isomerised hop extract is illuminated with an illumination intensity that exceeds 100 W/m$^2$.

6. The method according to claim 5, wherein the pre-isomerised hop extract is illuminated with an illumination intensity that exceeds 200 W/m$^2$.

7. The method according to claim 1, wherein the pre-isomerised hop extract is illuminated with the specified illumination intensity for at least 1 hour.

8. The method according to claim 1, wherein the temperature of the hop extract remains within the range of 0-100° C. during the illumination.

9. The method according to claim 1, wherein the diluted pre-isomerised hop extract is diluted with water to produce a diluted pre-isomerised hop extract.

10. The method according to claim 9, wherein the diluted pre-isomerised hop extract has an iso-alpha acid content in the range of 0.5-70 g/l when the illumination starts.

11. The method according to claim 10, wherein the diluted pre-isomerised hop extract has an iso-alpha acid content in the range of 1-25 g/l when the illumination starts.

12. The method according to claim 9, wherein the diluted pre-isomerised hop extract contains at least 80 wt. % water.

13. The method according to claim 12, wherein the diluted pre-isomerised hop extract contains at least 90 wt. % water.

14. The method according to claim 13, wherein the diluted pre-isomerised hop extract contains at least 95 wt. % water.

15. A light-stable hop extract that is obtained by illuminating a pre-isomerised hop extract comprising at least 10% of iso-alpha acids by weight of dry matter at an illumination intensity of at least 50 W/m$^2$ for at least 30 minutes,
 wherein the iso-alpha acids are selected from the group consisting of isohumulone, isoadhumulone, isocohumulone, pre-isohumulone, post-isohumulone and combinations thereof, and
 wherein the pre-isomerized hop extract is optionally diluted prior to illumination,
 and wherein the pre-isomerised hop extract when diluted has an iso-alpha acid content in the range of 0.2-200 g/l.

16. The light-stable hop extract according to claim 15, comprising at least 1% of iso-alpha acids by weight of dry matter.

17. The light-stable hop extract according to claim 15, comprising alpha-acids in a concentration of 0-10% by weight of dry matter.

18. The light-stable hop extract according to claim 15, comprising beta-acids in a concentration of 0-10% by weight of dry matter.

19. The light-stable hop extract according to claim 15, comprising reduced iso-alpha acids in a concentration that does not exceed 10% by weight of the iso-alpha acids; the reduced iso-alpha acids being selected from the group consisting of dihydro-iso-alpha acids, tetrahydro-iso-alpha acids, hexahydro-iso-alpha acids and combinations thereof.

20. A process of preparing a beer, comprising introducing a light-stable hop extract according to claim 15 to the beer.

21. The process according to claim 20, wherein the hop extract is introduced at a concentration of at least 2 mg/l.

22. The process according to claim 21, wherein the hop extract is introduced at a concentration of 5-200 mg/l.

23. The process according to claim 22, wherein the hop extract is introduced at a concentration of 10-150 mg/l.

* * * * *